United States Patent
Uomori et al.

(10) Patent No.: US 6,204,876 B1
(45) Date of Patent: Mar. 20, 2001

(54) STEREOSCOPIC COMPUTER GRAPHICS MOVING IMAGE GENERATING APPARATUS

(75) Inventors: Kenya Uomori, Hirakata; Atsushi Morimura, Nara, both of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 08/883,277

(22) Filed: Jun. 26, 1997

(30) Foreign Application Priority Data

Jun. 26, 1996 (JP) .................................................. 8-165653

(51) Int. Cl.[7] .................................................. H04N 13/02
(52) U.S. Cl. .................................................. 348/47
(58) Field of Search .................................. 348/48, 42, 43, 348/46, 47

(56) References Cited

U.S. PATENT DOCUMENTS

| | | | |
|---|---|---|---|
| 3,674,921 | * | 7/1972 | Goldsmith .............................. 348/43 |
| 4,743,965 | * | 5/1988 | Yamada et al. ........................ 348/43 |
| 4,905,081 | * | 2/1990 | Morton .................................. 348/43 |
| 5,012,351 | * | 4/1991 | Isono et al. ........................... 348/42 |
| 5,065,236 | | 11/1991 | Diner . |
| 5,416,510 | * | 5/1995 | Lipton et al. .......................... 348/43 |
| 5,767,898 | * | 6/1998 | Urano et al. .......................... 348/43 |
| 5,946,424 | * | 8/1999 | Oshima .................................. 348/42 |
| 6,005,607 | * | 12/1999 | Uomori et al. ........................ 348/42 |

FOREIGN PATENT DOCUMENTS

0583060A2  2/1994 (EP) .
0669758A1  8/1995 (EP) .

OTHER PUBLICATIONS

European Search Report, Appn. No. 97114294–2201, dated Apr. 4, 1999.

* cited by examiner

Primary Examiner—Young Lee
(74) Attorney, Agent, or Firm—Ratner & Prestia

(57) ABSTRACT

A stereoscopic computer graphics (CG) moving image generating apparatus includes a projection transformation section for generating a two-dimensional projection image as viewed from a camera using three-dimensional structural information of a subject; rendering sections for calculating a viewable image from the output of the projection transformation section; a camera sequence generating section for generating camera parameters defining projection transformation in the projection transformation section and capable of generating a moving image by varying the same; a motion calculating section for calculating the motion and/or motion parallax of a displayed subject using at least one of the three-dimensional structural information, the output of the projection transformation section, the output of the rendering sections, and the output of the camera sequence generating section; and a camera parameter correcting section for automatically or manually correcting the camera parameter so that the motion and/or motion parallax of the displayed subject do not exceed a tolerance range of a viewer, based at least on the output of the motion calculating section, the size of a screen for image display, and the viewing distance of the viewer.

24 Claims, 11 Drawing Sheets

Fig. 2 (a) CONVERGING SHOOTING
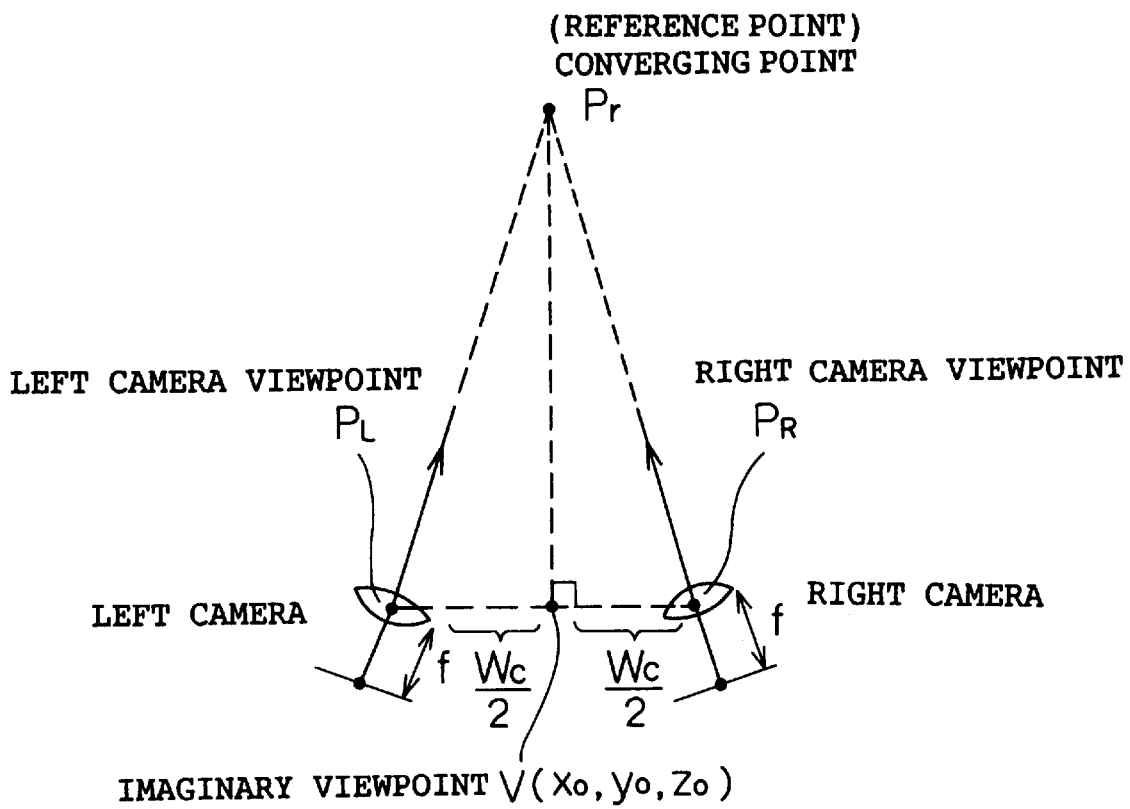
Fig. 2 (b) PARALLEL SHOOTING
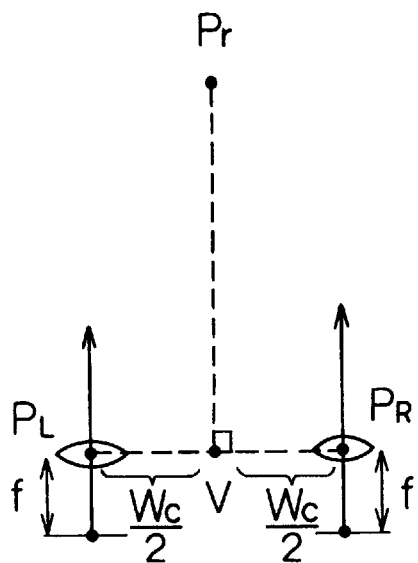

(CAMERA SEQUENCE DATA)

| TIME $t$ | $t_0$ | $t_1$ | $t_2$ | $t_3$ | ... |
|---|---|---|---|---|---|
| IMAGINARY VIEWPOINT $V$ | $(x_0,y_0,z_0)$ | $(x_1,y_1,z_1)$ | $(x_2,y_2,z_2)$ | $(x_3,y_3,z_3)$ | ... |
| REFERENCE POINT $P_r$ | $(X_0,Y_0,Z_0)$ | $(X_1,Y_1,Z_1)$ | $(X_2,Y_2,Z_2)$ | $(X_3,Y_3,Z_3)$ | ... |
| CAMERA $f$ | $f_0$ | $f_1$ | $f_2$ | $f_3$ | ... |
| CAMERA SPACING $W_c$ | $W_0$ | $W_1$ | $W_2$ | $W_3$ | ... |
| VELOCITY OF VERTEX OF EACH POLYGON $(P_1 \cdots P_N)$ | $V_{P10}$ <br> ---- <br> $V_{PN0}$ | $V_{P11}$ <br> ---- <br> $V_{PN1}$ | $V_{P12}$ <br> ---- <br> $V_{PN2}$ | $V_{P13}$ <br> ---- <br> $V_{PN3}$ | ... |

Fig. 4(a)
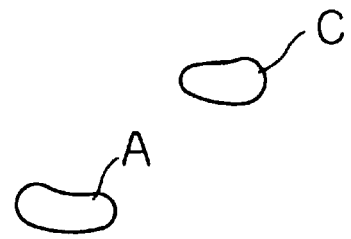
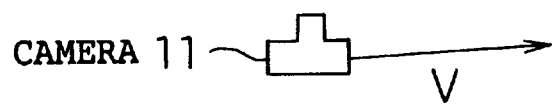
Fig. 4(b)
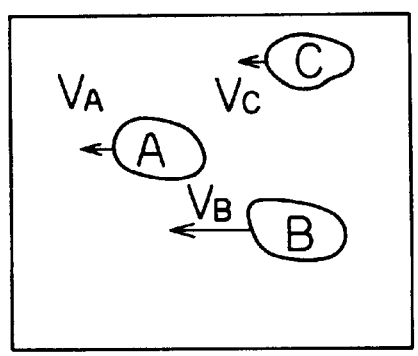

VELOCITY HISTOGRAM

RELATIVE VELOCITY

Fig. 7(a)
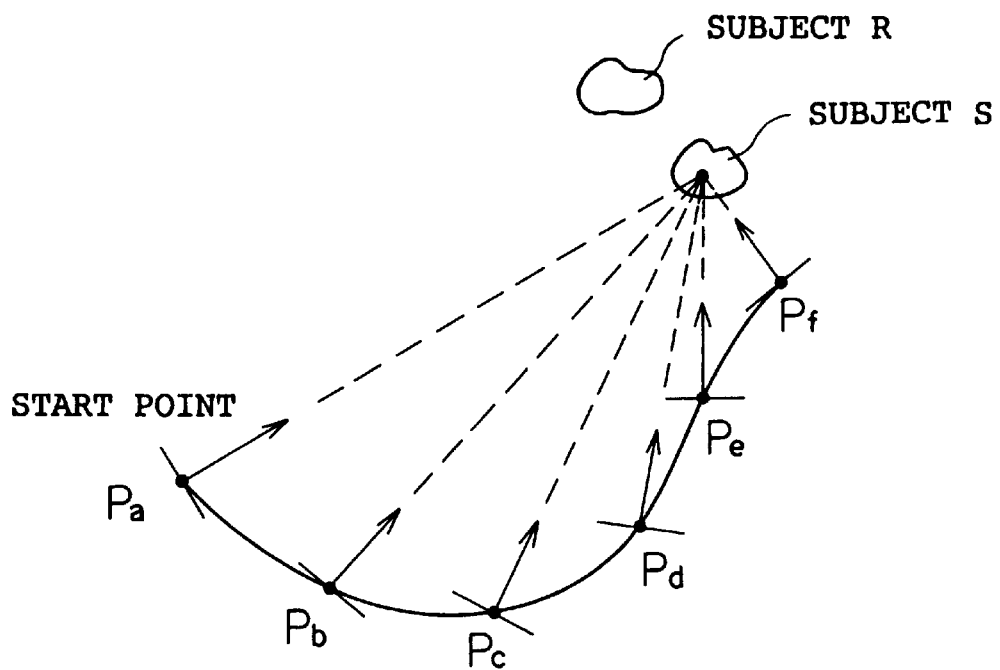
Fig. 7(b)
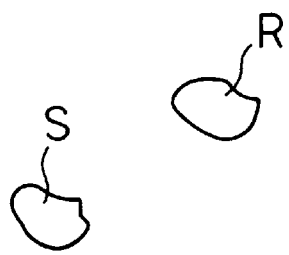
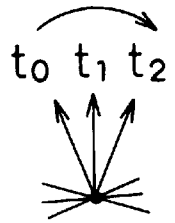

| EDGE NUMBER | START POINT, END POINT |
|---|---|
| L1 | V1,V4 |
| L2 | V4,V3 |
| ⋮ | ⋮ |
| L12 | V7,V3 |

| VERTEX COORDINATES | |
|---|---|
| V1 | $(x_1, y_1, z_1)$ |
| V2 | $(x_2, y_2, z_2)$ |
| ⋮ | ⋮ |
| V8 | $(x_8, y_8, z_8)$ |

| FACE NUMBER | VERTEX NUMBER | FACE COLOR |
|---|---|---|
| F1 | V1,V5,V8,V4 | R1,G1,B1 |
| F2 | V5,V6,V7,V8 | R2,G2,B2 |
| ⋮ | ⋮ | ⋮ |
| F6 | V6,V5,V1,V2 | R6,G6,B6 |

STEREOSCOPIC COMPUTER GRAPHICS MOVING IMAGE GENERATING APPARATUS

BACKGROUND OF THE INVENTION

1. Field of the Invention

The present invention relates to the generation of three-dimensional CG (computer graphics) moving images, and more particularly to a stereoscopic CG moving image generating apparatus capable of presenting the viewer with proper motion and depth perception according to the camera and subject motions, magnitude of motion parallax, and display viewing conditions.

2. Description of the Prior Art

An example of a prior art stereoscopic CG image generating apparatus is shown in FIG. 9. According to this apparatus, three-dimensional structural information, describing a three-dimensional shape of a subject by a surface model, is input (the subject is approximated by a plurality of small surfaces called polygons, the structural information defining the three-dimensional positions of the vertices of each polygon and the faces and edges formed by the polygons), and the subject defined by this information is arranged in a world coordinate system. Then, projection transformation sections 1 and 2 calculate the two-dimensional positions of the subject that would be projected on a film when photographed by an imaginary camera, and rendering sections 3 and 4 determine the brightness and color (e.g., R, G, B values) of an image within each polygon on the basis of the material of the subject, the type of the light source used, and the three-dimensional positions.

For example, a geometric model of a polyhedron, such as shown in FIG. 10(a), is described by the three-dimensional coordinates of vertices V1 to V8 and the data structure (forming faces and edges) of the geometric model, as shown in FIG. 10(b), and the subject described by this information is arranged in the world coordinate system such as shown in FIG. 11(a).

That is, an image (more specifically, vertices) of the subject projected on a screen 50, as viewed from viewpoint E of the camera, is calculated. Then, the positions on the screen of the faces and edges formed by the vertices and their brightness and color are calculated to produce an image for output.

At this time, in order to produce a stereoscopic image, images as viewed from at least two viewpoints must be calculated; as shown in FIG. 11(b), camera parameters are described by the viewpoint positions of cameras CL and CR, the spacing Wc between the plurality of cameras, the three-dimensional coordinates of the converging point P of the cameras in the case of converging shooting, and the focal length f of the cameras (or the field of view θ).

The above description essentially concerns the generation of a still CG image. When generating moving CG images with the cameras and subject moving, the images are generated one by one by sequentially changing the motion parameters of the cameras and subject. A camera sequence generating section 5 and an object sequence generating section 6 are provided to store and supply this sequence data.

However, with the above prior art stereoscopic CG image generating apparatus, the motion parameters of the plurality of cameras and the motion parameters of the subject, if not properly adjusted, may often not match the visual functions of the viewer, straining the visual system of the viewer.

For example, for a human to be able to perceive motion on the screen without unnaturalness, it is desirable that the moving velocity of target objects be held within a certain value. Furthermore, to provide proper depth perception by motion parallax (relating to the relative velocity between a plurality of target objects), the relative velocity also must be limited. This requirement is also related to the size of a displayed image and the viewing distance. Accordingly, the prior art has had the problem that unless these parameters are always set correctly, improper images are generated that can cause unnaturalness and can lead to fatigue and eyestrain.

In view of the above problem of the prior art stereoscopic CG image generating apparatus, it is an object of the present invention to provide a stereoscopic CG moving image generating apparatus that can automatically generate natural-looking and easy-to-view stereoscopic images for a viewer regardless of the viewing distance and screen size.

SUMMARY OF THE INVENTION

According to the present invention, there is provided a stereoscopic CG moving image generating apparatus has:

a projection transformation section for generating a two-dimensional projection image as viewed from a camera from three-dimensional structural information describing a three-dimensional shape of a subject;

a plurality of rendering sections each for calculating an image for actual viewing from the output of said projection transformation section;

a camera sequence generating section for generating camera parameters defining projection transformation in said projection transformation section and capable of generating a moving image by varying the same;

a motion calculating section for calculating the motion and/or motion parallax of a displayed subject from said three-dimensional structural information and the output of said projection transformation section or said rendering sections and from the output of said camera sequence generating section; and a camera parameter correcting section for automatically or manually correcting the camera parameter so that the motion and/or motion parallax of the displayed subject do not exceed within a tolerance range of a viewer, based at least on the output of said motion calculating section, the size of a screen for image display, and the viewing distance of the viewer.

BRIEF DESCRIPTION OF THE DRAWINGS

FIG. 2 is a diagram showing camera parameters in CG space according to the present invention;

FIG. 4 is a diagram showing the relationship between camera motion and generated images;

FIG. 7 is a diagram showing camera motion according to the present invention;

DESCRIPTION OF THE REFERENCE NUMERALS

1. PROJECTION TRANSFORMATION SECTION (FOR RIGHT EYE), 2. PROJECTION TRANSFORMATION SECTION (FOR LEFT EYE), 3. RENDERING SECTION (FOR RIGHT EYE), 4. RENDERING SECTION (FOR LEFT EYE), 5. CAMERA SEQUENCE GENERATING SECTION, 6. OBJECT SEQUENCE GENERATING SECTION, 7. MOTION PARALLAX CALCULATING SECTION, 8. MOTION PARALLAX JUDGING SECTION, 9. CAMERA PARAMETER CORRECTING SECTION, 10. OBJECT MOTION CORRECTING SECTION, 12. BINOCULAR PARALLAX CALCULATING SECTION, 13. BINOCULAR PARALLAX JUDGING SECTION DESCRIPTION OF THE PREFERRED EMBODIMENTS

The present invention will be described below with reference to the drawings illustrating the preferred embodiments thereof.

Figure 1:
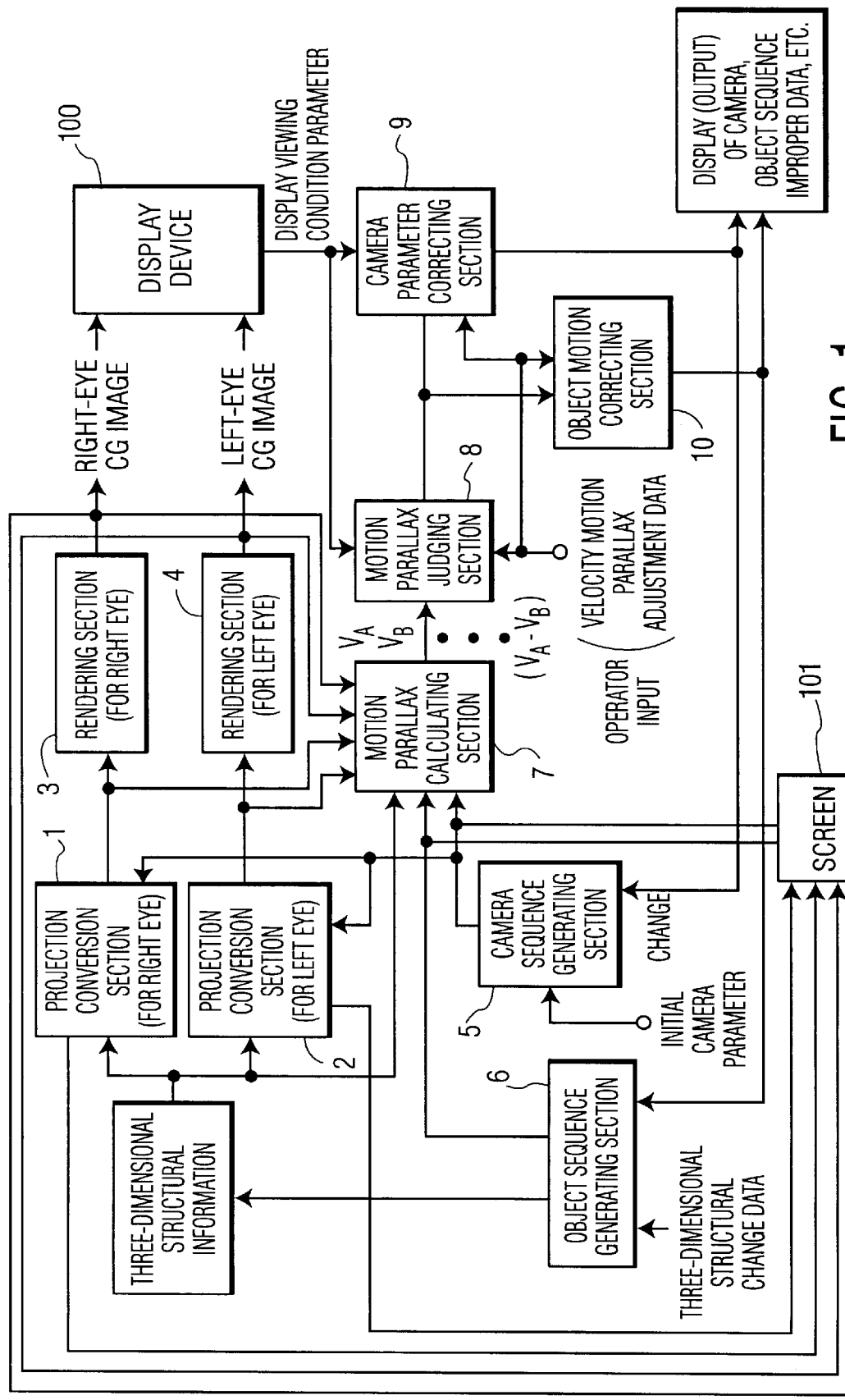
FIG. 1 is a diagram showing the configuration of a stereoscopic CG moving image generating apparatus according to a first embodiment of the present invention.

FIG. 1 is a diagram showing the configuration of a stereoscopic CG image generating apparatus according to a first embodiment of the present invention. In FIG. 1, reference numerals 1 and 2 are projection transformation sections for accepting three-dimensional structural information at their inputs and for transforming the structural information, 3 and 4 are rendering sections for rendering the outputs of the projection transformation sections 1 and 2, 5 is a camera sequence generating section, and 6 is an object sequence generating section. These elements are the same as those used in the prior art stereoscopic CG image generating apparatus.

This embodiment differs from the prior art stereoscopic CG image generating apparatus by the inclusion of a motion parallax calculating section 7, a motion parallax judging section 8, a camera parameter correcting section 9, and an object motion correcting section 10.

The operation of the thus configured stereoscopic CG moving image generating apparatus of the present embodiment will be described below.

First, three-dimensional structural information, describing a three-dimensional shape of a subject by a surface model, is input to the projection transformation sections 1 and 2 as well as to the motion parallax calculating section 7. While checking the output images produced on a stereoscopic image display device 100 connected to the rendering sections 3 and 4, and also viewing a screen 101 displaying a positional relationship between the subject and imaginary camera, a CG creator arranges the subject and the imaginary camera (at midpoint between left and right cameras) at appropriate positions in the world coordinate system as he desires, and determines their orientations. When dynamically expressing a scene by moving the camera, the CG creator stores camera motion data (data on the temporal change of camera position and orientation) in the camera sequence generating section 5. Also, when the subject is in motion, the subject's motion information, etc. are stored in the object sequence data generating section 6 (see FIG. 3).

Figure 3:
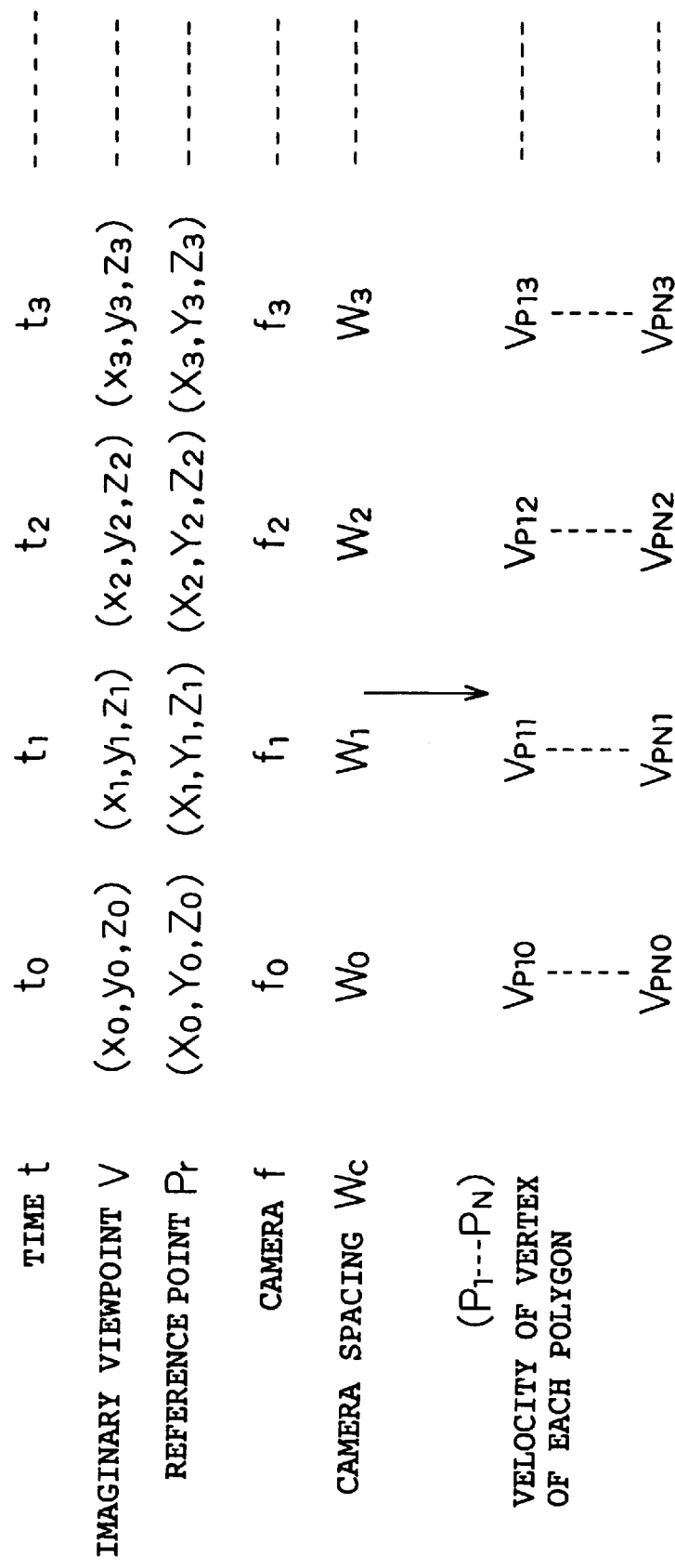
FIG. 3 is a diagram for explaining camera sequence data according to the present invention.

Here, the left and right cameras are arranged at positions of ±Wc/2 along the x-axis with imaginary camera position V at its origin (see FIG. 2). The camera positions are stored as camera sequence data along with camera focal length f and reference point Pr (in the case of converging shooting in FIG. 2(a)). In the case of parallel shooting, the left and right cameras are set parallel to each other with the imaginary camera position V pointing toward the reference point Pr, as shown in FIG. 2(b). One example of camera sequence data is shown in FIG. 3. As shown, the values of imaginary viewpoint V, reference point Pr, lens focal length f, and camera spacing Wc at each time ti are defined.

Next, the motion parallax calculating section 7 calculates the motion and motion parallax of the displayed subject. This will be explained using the example shown in FIG. 4. In FIG. 4(a), it is assumed that the camera 11 is moving to the right while shooting the subjects A, B, and C. The images captured by the camera at this time are as shown in FIG. 4(b). That is, the subjects A, B, and C are moving to the left on the screen. The moving velocities of the subjects at this time are Va, Vb, and Vc, respectively, the velocity decreasing with increasing distance from the camera. These velocities are calculated, using a known CG data calculation technique, from the camera sequence data stored in the camera sequence generating section 5 as well as the three-dimensional structural information, and also from the object data stored in the object sequence generating section 6 when the subjects also are in motion.

That is, since the three-dimensional structural information contains information on vertex coordinates, the motion of each vertex can be calculated directly from the vertex information and the camera sequence data which is data on the temporal change of the camera parameters (see FIG. 4). It is also possible to describe it by data at the centroidal position of each polygon. The motion can also be calculated using a known image processing technique (such as a differential method, block matching method, etc.) from the images output from the projection transformation sections 1 and 2 or the rendering sections 3 and 4 without using the three-dimensional structural information.

Figure 5A:
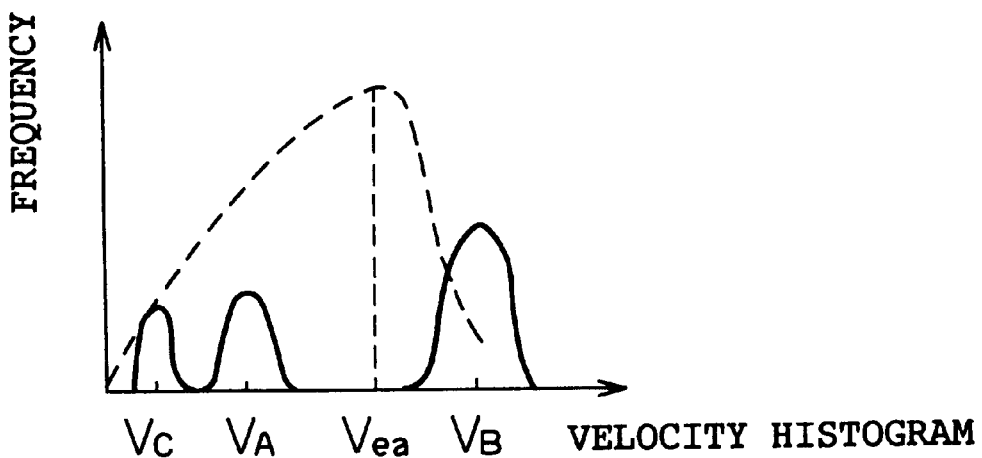
FIG. 5 is a diagram showing examples of motion and motion parallax calculation results.
Figure 5B:
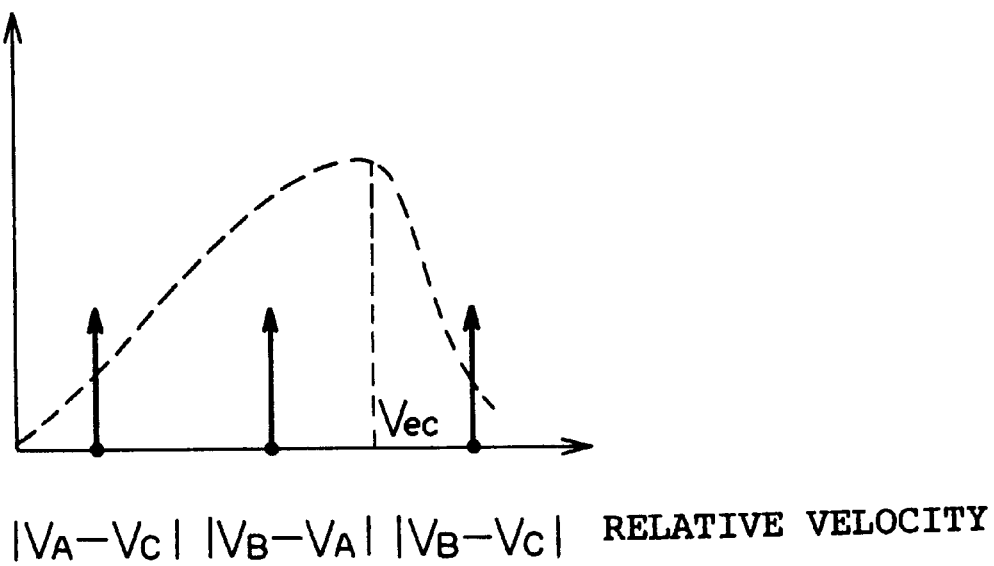

When we calculate a histogram of velocity for each of the thus obtained vertices or polygons in the three-dimensional information, generally the result will be as shown in FIG. 5(a). Since each subject may exhibit motion or rotation of its own, the velocity distribution has a certain degree of width. The respective peak positions are calculated, which are approximately equal to the earlier mentioned Va, Vb, and Vc. These values are described for the respective subjects. Generally, it is difficult to derive velocity peak for each subject from the histogram peak information alone; to address this difficulty, based on the subject information given as the three-dimensional structural information the vertex data may be separated for each subject so that the peak of the velocity distribution may be obtained within the data, or from the histogram distribution of FIG. 5(a) the distribution peaks may be grouped together to calculate the velocity frequency peak for each subject. Based on the thus obtained velocities Va, Vb, and Vc of the subjects, the relative velocity (motion parallax) between each subject is calculated. The results of the calculations are as shown in FIG. 5(b). The relative velocity distribution between each subject can thus be obtained.

In the above description, calculations are made based on each of the polygons forming each image to obtain the data of FIGS. 5(a) and 5(b), but it is also possible to calculate the motion of each subject as represented by the motion of its center position by using three-dimensional structural information. In the latter case, the amount of computation can be further reduced.

Next, based on the obtained histogram of velocity and the image viewing conditions (viewing distance, display screen size), the motion parallax judging section 8 in FIG. 1 judges whether the motion of the generated moving image and the magnitude of relative motion are appropriate to the viewer.

Figure 6A:
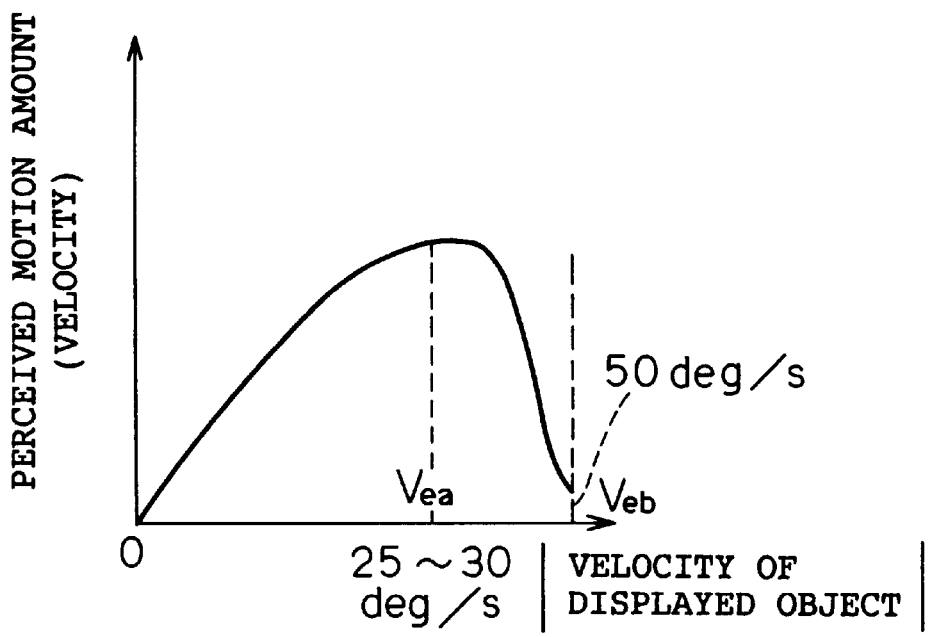
FIG. 6 is a diagram showing the characteristics of human vision for motion and motion parallax according to the present invention.
Figure 6B:
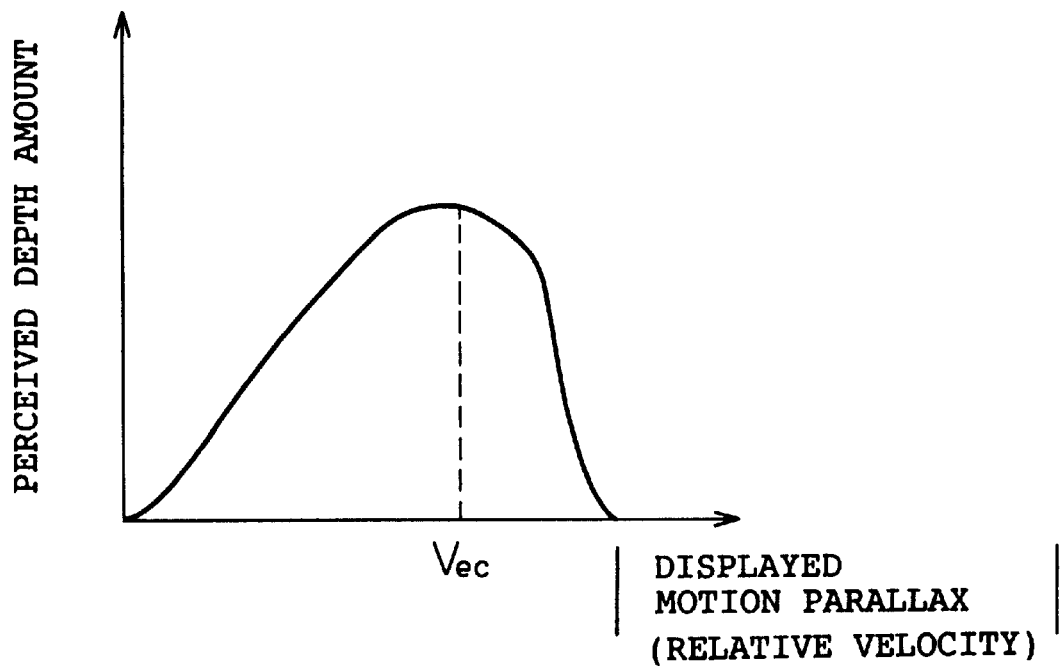

The relationship between the moving velocity of a subject and human perception of motion is shown in FIG. 6(a), and the relationship between the relative velocity between a plurality of subjects and the amount of human perception of depth is shown in FIG. 6(b).

More specifically, FIG. 6(a) shows the motion perception characteristic of human vision as the velocity of a displayed image versus the amount of motion perceived. As the velocity increases from 0, the perceived velocity increases linearly, but decreases after the velocity of the displayed image exceeds Vea. This shows the limitations of the motion perception of human vision, that is, the human can no longer perceive the velocity correctly when the velocity of the displayed image exceeds Vea. When the velocity is further increased, at velocity Veb the viewer can perceive the motion of the displayed image but cannot perceive its velocity even approximately.

On the other hand, FIG. 6(b) is a characteristic diagram showing the magnitude of human perception of depth versus the relative velocity. As the relative velocity increases from 0, the amount of perceived depth increases linearly, but begins to decrease when the relative velocity exceeds Vec, until finally decreasing to nearly zero. Further, the characteristics shown in FIGS. 6(a) and 6(b) vary depending on the display condition (the viewer's viewing angle for display area). The tolerance limits increase as the viewing angle increases. These characteristics are selected by the user entering the viewing conditions.

By taking the above human perceptual characteristics into account, the motion parallax judging section 8 judges whether the camera velocity and the distance between the subjects as viewed from the camera should be adjusted to bring the motion of the displayed images and their motion parallax within the tolerance range of human vision.

The following describes how the camera parameter correcting section 9 and the object motion correcting section 10 correct image motion. For example, we consider the case where the results of the calculations by the motion parallax calculating section 7 and the motion perception characteristic of human vision are as shown in FIG. 5(a). The dashed line corresponds to the curve shown in FIG. 6(a). In this case, the human vision characteristic is expressed by velocity whose unit is deg/s. Since the motion parallax calculating section 7 calculates the motion and motion parallax on an image displayed by dots, its output is expressed in terms of the velocity of the display position coordinates (the number of dots or imaginary coordinate values per second). To transform the velocity in dots into the degrees per second in the actual viewing condition, the viewer's viewing distance and screen size data are used. Calculation is made to determine the viewing angle corresponding to the length on the screen expressed in the number of dots.

In the case of FIG. 5(a), the motion of the subject B is so fast that the viewer can hardly perceive it because the velocity of the subject B exceeds Vea.

(A) Camera correction

To prevent the above situation, the camera parameter correcting section 9 applies a correction by reducing the moving velocity of the camera to bring VB below Vea, and stores the result in the camera sequence generating section 5. In this case, since the velocity is reduced, it takes longer time before the camera reaches its initially stored position.

If the camera sequences before and after the correction are displayed on an operation terminal or the like to indicate where and how the correction has been made, as shown in FIG. 1, the system is easy for the CG creator to use.

How much the camera velocitieshould be reduced depends more or less on the CG creator's taste; therefore, provisions may be made to allow the creator to enter velocity and motion parallax adjustment data and change the magnitude of the critical value Vea, thereby changing the corrected camera velocity, as appropriate, to obtain his desired setting. In this way, after the correction by the camera correcting section, the camera velocity is changed, thus changing the velocity of the image.

As for the motion parallax, on the other hand, in the case shown in FIG. 5(b), the moving velocity of the camera is reduced to bring the motion parallax VB-VC within Vec.

In this case also, how much the camera velocities should be reduced depends more or less on the CG creator's taste; therefore, provisions may be made to allow the creator to enter velocity and motion parallax adjustment data and change the magnitude of the critical value Vec, thereby changing the corrected camera velocity, as appropriate, to obtain his desired setting. In this way, after the correction by the camera correcting section, the camera velocity is changed, thus changing the relative velocity between the images.

(B) Object sequence correction

When the motion of the displayed subject itself is fast, and the amount of motion exceeds the tolerance limit of human vision, the object motion correcting section 10 corrects the velocity of the object to bring the maximum value VB of the object's moving velocity within Vea, and stores the result in the object sequence generating section 6. Further, when the distances of the displayed subjects B and C from the camera change greatly, the positions of the subjects (the distance between the subjects) and their moving velocities are corrected to reduce their moving amount and velocity, and the results are stored in the object sequence generating section 6.

Further, if the object motion correcting section 10 is configured to display the object sequences before and after the correction to indicate where and how the correction has been made and also to display an object sequence portion that cannot provide proper motion and motion parallax for display, a system easy to use for CG creators can be achieved.

Here consider the case where there are two subjects R and S and the camera moves from Pa to Pf with the camera always pointing toward the subject S, as shown in FIG. 7(a). In such a case also, moving images that match the vision characteristics of the viewer can be generated by calculating the motion and motion parallax components of the subjects and, if these exceed the tolerance limits of the viewer, then reducing the moving velocity of the camera. In this case, the motion component only of the subject R matters, and the motion component of the subject S becomes small. In such a case, the present invention is effective for the subject R which is not at the camera center.

Also consider the case shown in FIG. 7(b) where the camera is panned while it is being held at the same position.

In this case, only the motion components of the generated images occur; if these exceed the tolerance limits of the viewer, the panning velocity of the camera can be reduced so that the generated moving images match the vision characteristics of the viewer.

It is also possible to correct both the camera motion and the subject motion. In this case, the operator determines the proportions in which the correction amounts for the two motions are combined. For example, by holding the camera motion limit to 50% of its original value, and by handling the rest by correcting the subject motion, the maximum values of the image motion and motion parallax can be brought within their target values.

As described above, according to the present embodiment, by correcting the camera motion and the positions and motions of the subjects, moving images can be generated that look natural to the viewer with the motion and motion parallax of the images corrected to match the vision characteristics of the viewer.

Figure 8:
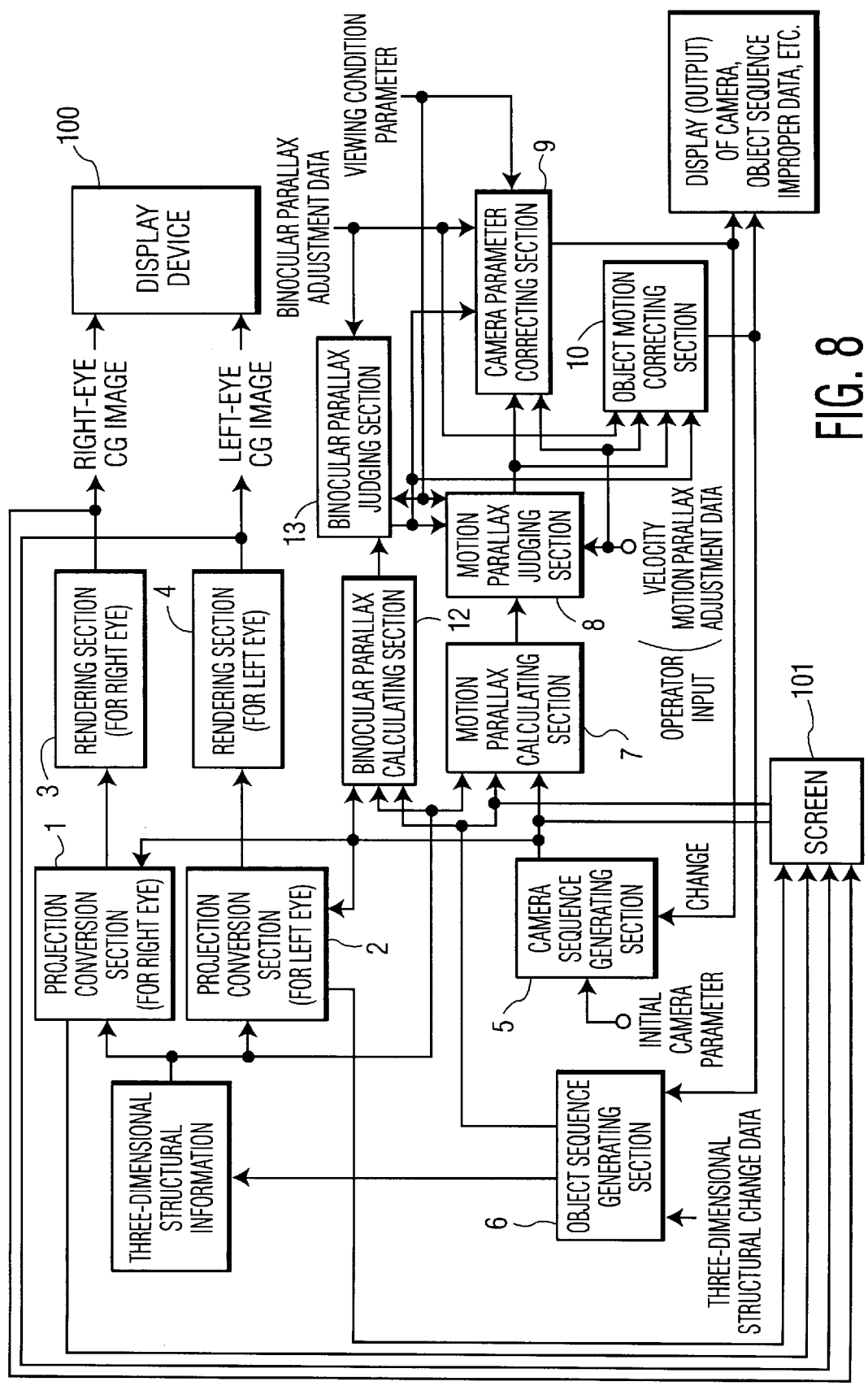
FIG. 8 is a diagram showing the configuration of a stereoscopic CG moving image generating apparatus according to a second embodiment of the present invention.
Figure 9:
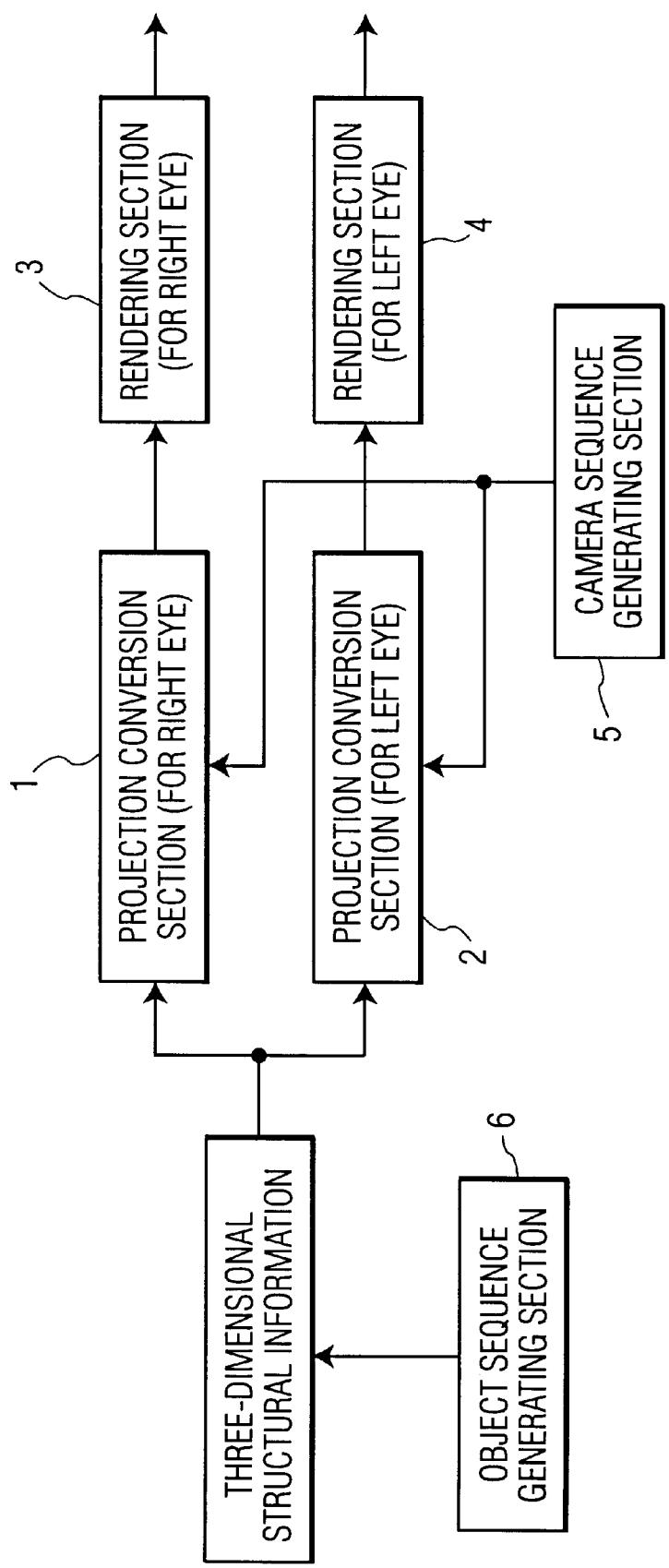
FIG. 9 is a diagram showing the configuration of a stereoscopic CG image generating apparatus according to the prior art.
Figure 10:
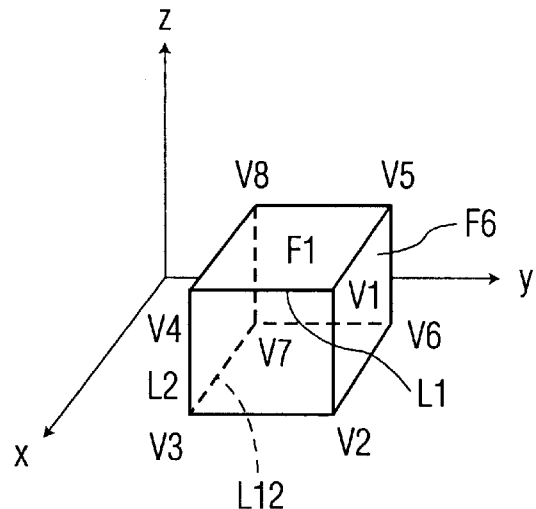
FIG. 10(a) is a diagram showing an example of a geometric model for explaining three-dimensional structural information.
FIG. 10(b) is a diagram showing the data structure of the geometric model.
Figure 11:
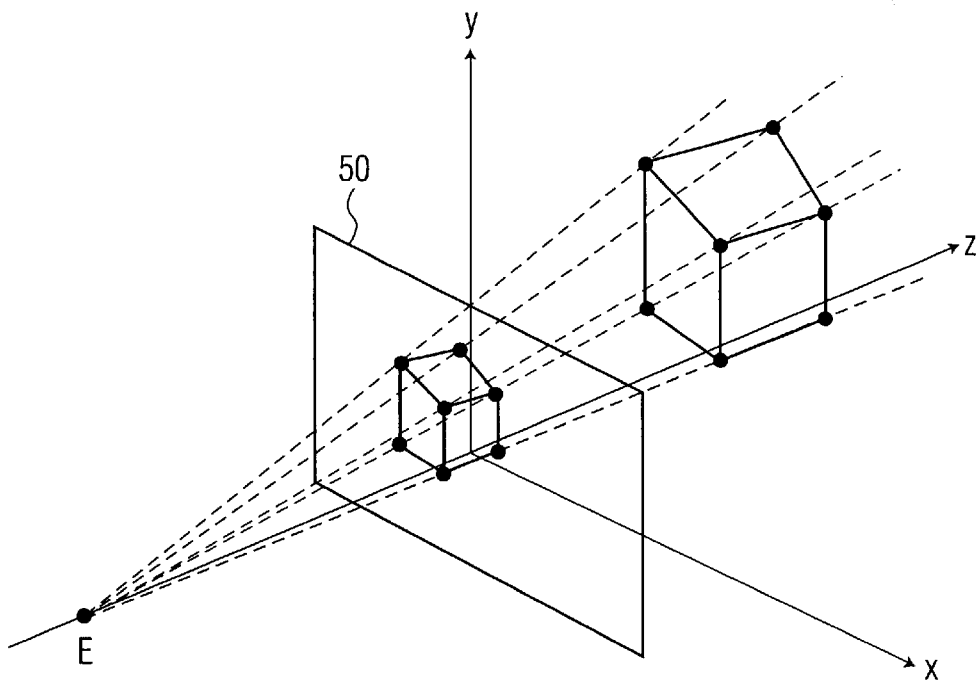
FIG. 11(a) is a diagram for explaining a world coordinate system and projection transformation.
FIG. 11(b) is a diagram for explaining camera parameters.
Figure 11:
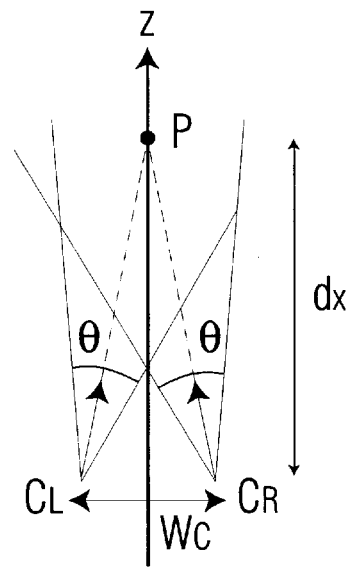

FIG. 8 is a diagram showing the configuration of a stereoscopic CG image generating apparatus according to a second embodiment of the present invention. In FIG. 8, reference numerals 1 and 2 are projection transformation sections, 3 and 4 are rendering sections, 5 is a camera sequence generating section, 6 is an object sequence generating section, 7 is a motion parallax calculating section, 8 is a motion parallax judging section, 9 is a camera parameter correcting section, and 10 is an object motion correcting section. These elements are the same as those used in the stereoscopic CG image generating apparatus of the first embodiment of the present invention. The present embodiment differs from the stereoscopic CG moving image generating apparatus of the first embodiment by the inclusion of a binocular parallax calculating section 12 and a binocular parallax judging section 13.

The operation of the thus configured stereoscopic CG moving image generating apparatus of the present embodiment will be described below.

The basic operation of the present embodiment is the same as the first embodiment of the present invention.

First, three-dimensional structural information, describing a three-dimensional shape of a subject by a surface model, is input to the projection transformation sections 1 and 2 and also to the motion parallax calculating section 7 and binocular parallax calculating section 12. The CG creator stores camera motion data (data on the temporal change of camera position and orientation) in the camera sequence generating section 5. Also, when the subject is in motion, the creator stores the subject's motion information, etc. in the object sequence data generating section 6 (see FIG. 3).

Next, the motion parallax calculating section 7 calculates the motion and motion parallax of the displayed subject. This will be explained using the example shown in FIG. 4. In FIG. 4(a), it is assumed that the camera 11 is moving to the right while shooting the subjects A, B, and C. The images captured by the camera at this time are as shown in FIG. 4(b). When we calculate a velocity histogram for each vertex or each polygon in the three-dimensional information at this time, generally the result will be as shown in FIG. 5(a). The respective peak positions are calculated, which are approximately equal to the earlier mentioned Va, Vb, and Vc. These values are described for the respective subjects. Next, based on the thus obtained velocities Va, Vb, and Vc of the subjects, the relative velocity between each subject is calculated. The results of the calculations are as shown in FIG. 5(b). The relative velocity distribution between each subject can thus be obtained.

Next, based on the obtained velocity histogram and the image viewing conditions (viewing distance, display screen size), the motion parallax judging section 8 judges whether the camera velocity and the distance between the subjects as viewed from the camera should be adjusted to bring the motion of the displayed images and their motion parallax within the tolerance range of human vision, and the camera parameter correcting section 9 corrects the motion of the subjects. In the case of FIG. 5(a), the motion of the subject B is so fast that the viewer can hardly perceive it because the velocity of the subject B exceeds Vea. To prevent this, the camera parameter correcting section 9 applies a correction by reducing the moving velocity of the camera to bring VB below Vea, and stores the result in the camera sequence generating section 5. As for the conditions for motion parallax, in the case shown in FIG. 5(b), the moving velocity of the camera is reduced, or the distance between the subjects B and C is reduced, to bring the motion parallax VB-VC within Vec. In this way, the moving velocity of the camera can be reduced, or when it is allowed to change the positions of the subjects, the distance between the subjects B and C is reduced to reduce the motion parallax between B and C. The moving velocity of the camera affects the motion and relative motion of the images, while the distance between the subjects affects the relative velocity (motion parallax).

The above-described operation is the same as in the first embodiment of the present invention. In the second embodiment, the following operation is added.

When the camera moves in the depth direction with respect to the subjects, human perception of motion in the depth direction is affected by the change of motion parallax, and to a greater extent by the change of binocular parallax. In this case, since the change of binocular parallax is excessively large, the viewer has difficulty in perceiving the depth.

To prevent this, the binocular parallax calculating section 12 calculates the change of the binocular parallax of the subjects from the three-dimensional structural information, camera sequence data, and object sequence data; based on the result of the calculation and considering the image viewing conditions (viewing distance, display screen size), the binocular parallax judging section 13 reduces the amount of camera motion in the depth direction if the change of the binocular parallax of the images actually displayed is larger than a predetermined value (entered by the CG creator). The result is the generation of easy-to-view stereoscopic CG moving images.

Also, by entering binocular parallax adjustment data to the binocular parallax judging section 13 and the camera parameter correcting section 9, the CG creator specifies the extent to which the binocular parallax is allowed to be changed. This can address special applications, for example, where the CG creator deliberately increases the magnitude of binocular parallax.

Here, the binocular parallax calculating section 12 may be configured to calculate the binocular parallax from the outputs of the projection transforming sections 1 and 2 and the rendering sections 3 and 4 by using a known image processing technique (such as a gradient method, matching method, etc.).

Likewise for the case where the subject moves substantially in the depth direction, if the change of the binocular parallax calculated by the binocular parallax calculating section 12 is greater than the tolerance range, an easy-to-view stereoscopic CG image can be generated by correcting the object sequence data to reduce the amount of motion of the subject. This tolerance range varies according to the viewing condition (viewing angle of display area). The tolerance range increases with increasing viewing angle. Data on this tolerance range is contained in the binocular parallax judging section 13; the user enters the viewing condition in advance, and a tolerance range characteristic corresponding to it is used.

Further, when the subject moves along the direction of the camera optical axis, the motion and motion parallax of the subject occur, but the subject captured by two cameras appears to be moving in symmetrical fashion on the left and right screens. In this case, the perception of depth is affected by the change of binocular parallax rather than the change of motion parallax. The binocular parallax judging section 13 detects such a situation, and corrects subject motion and camera motion so that the change of the binocular parallax becomes smaller than a predetermined value. In this way, in a situation that may be judged as causing motion and motion parallax from the viewpoint of a single camera, the situation can be judged as a change in binocular parallax, and proper camera sequence and object sequence data can thus be generated.

Furthermore, the camera parameter correcting section 9 and the object motion correcting section 10 correct the portions of the camera sequence and object sequence which are judged improper in view of the change of the binocular parallax, and display those portions to the CG creator via a terminal or the like. In this way, the system can make editing work easier.

As described above, according to the present embodiment, since the change of binocular parallax as well as the change of motion parallax can be held within the proper range, stereoscopic moving images can be generated that best match the vision characteristics of the viewer and that look natural.

In the first and second embodiments of the present invention, image motion, motion parallax, and binocular parallax were calculated from the three-dimensional structural information and the outputs of the camera sequence and object sequence generating sections; alternatively, these may be calculated from the outputs of the projection transformation sections and rendering sections by using known image processing techniques (using matching processing, differential method or other methods).

Further, the first and second embodiments of the present invention have been described as generating binocular stereoscopic CG moving images, but the number of projection transformation sections 1, 2 and rendering sections 3, 4 may be increased to provide multi-view point stereoscopic images consisting of a larger number of images. In the latter case, as many camera parameters as there are projection transformation sections are described in the camera sequence generator 5.

Also, the present invention has been described by taking stereoscopic CG images for example, but the invention is also applicable for conventional monocular three-dimensional CG moving images using a single camera.

Further, in the first and second embodiments of the present invention, in the case of binocular stereoscopic images the motion and motion parallax of the subject may be calculated using the parameter of the imaginary viewpoint V (FIG. 2) or the parameter of the right or left camera viewpoint; alternatively, the calculations may be made by using both parameters and by taking their average value.

Likewise, in the case of multi-view point stereoscopic CG moving images, the calculations may be made by using the parameter of the viewpoint at the center of the camera array or the parameter of the camera nearest to the center; alternatively, the calculations may be made by using a plurality of camera parameters and by taking their average value, maximum value, minimum value, or median value.

In the first and second embodiments of the present invention, when it is desired to give the impression that something is moving though the viewer's eyes cannot follow the motion, by allowing the changes in image motion, motion parallax, and binocular parallax to swing beyond the tolerance limits of the viewer's motion and depth perception characteristics, then provisions may be made to allow the CG creator to temporarily stop the operation of the motion parallax judging section 8 or the camera parameter correcting section 9 or the object parameter correcting section 10 and to set the camera parameters or object parameters as he desires.

What is claimed is:

1. A stereoscopic computer graphics moving image generating apparatus comprising:

projection transformation means for generating a two-dimensional projection image as viewed from a camera using three-dimensional structural information of a subject;

rendering means for calculating a viewable image from the output of said projection transformation means;

camera sequence generating means for generating camera parameters defining projection transformation in said projection transformation means and capable of generating a moving image by varying said projection transformation;

motion calculating means for calculating motion parallax of a displayed subject using at least one of said three-dimensional structural information, the output of said projection transformation means, the output of said rendering means, and the output of said camera sequence generating means; and camera parameter correcting means for correcting the camera parameter so that at least one of the motion and motion parallax of the displayed subject do not exceed a tolerance range of sense of a viewer, wherein said sense includes at least one of a sense of motion and a sense of depth, and said tolerance range of said sense of motion of a viewer corresponds to said motion, and said tolerance range of said sense of depth of a viewer corresponds to said motion parallax.

2. A stereoscopic computer graphics moving image generating apparatus according to claim 1, wherein there are a plurality of cameras and a plurality of projection transformation means, and said motion calculating means calculates motion parallax of the subject projection-transformed with a viewpoint at or near a central position among said plurality of cameras.

3. A stereoscopic computer graphics moving image generating apparatus according to claim 1, wherein there are a plurality of cameras and a plurality of projection transformation means, and said motion calculating means calculates motion parallax of the subject projection-transformed with viewpoints at positions of at least one of said plurality of cameras, and outputs at least one of their average value, maximum value, and minimum value.

4. A stereoscopic computer graphics moving image generating apparatus according to claim 1, further comprising binocular parallax calculating means for calculating binocular parallax and binocular parallax judging means for judging the degree of change of binocular parallax using said calculated binocular parallax, and wherein:

said camera parameter correcting means corrects said camera parameter so that the change of said binocular parallax does not exceed a prescribed range.

5. A stereoscopic computer graphics moving image generating apparatus according to claim 4, wherein said camera parameter correcting means produces an output for display so that a portion of a camera sequence where settings are improper for at least one of the change of the motion, motion parallax, and binocular parallax of the subject can be distinguished from other portions of the sequence.

6. A stereoscopic computer graphics moving image generating apparatus according to claim 4, wherein said camera parameter correcting means produces an output for display so that a portion corrected for improper settings of the change of at least one of the motion, motion parallax, and binocular parallax of the subject, can be distinguished from other portions of the sequence.

7. A stereoscopic computer graphics moving image generating apparatus according to claim 1, wherein the camera parameter correcting means corrects the camera parameter automatically or manually.

8. A stereoscopic computer graphics moving image generating apparatus according to claim 1, wherein the camera parameter correcting means corrects the camera parameter using at least one of the output of the motion calculating means, the size of a screen for image display, and a viewing distance of the viewer.

9. A stereoscopic computer graphics moving image generating apparatus comprising:

projection transformation means for generating a two-dimensional projection image as viewed from a camera using three-dimensional structural information of a subject;

rendering means each for calculating a viewable image from the output of said projection transformation means;

object sequence generating means for generating an object sequence defining said three-dimensional structural information and capable of generating a moving image by varying said three-dimensional structural information;

motion calculating means for calculating at least one of the motion and motion parallax of a displayed subject using at least one of said three-dimensional structural information, the output of said projection transformation means, the output of said rendering means, and the output of said object sequence generating means; and object motion correcting means for correcting the object sequence so that at least one of the motion and motion parallax of the displayed subject does not exceed a tolerance range of sense of a viewer, wherein said sense includes at least one of a sense of motion and a sense of depth, and said tolerance range of said sense of motion of a viewer corresponds to said motion, and said tolerance range of said sense of depth of a viewer corresponds to said motion parallax.

10. A stereoscopic computer graphics moving image generating apparatus according to claim 9, wherein there are a plurality of cameras and a plurality of projection transformation means, and said motion calculating means calculates at least one of the motion and motion parallax of the subject projection-transformed with a viewpoint at or near a position central among said plurality of cameras.

11. A stereoscopic computer graphics moving image generating apparatus according to claim 9, wherein there are a plurality of cameras and a plurality of projection transformation means, and said motion calculating means calculates at least one of the motion and motion parallax of the subject projection-transformed with viewpoints at positions of at least one of said plurality of cameras, and outputs at least one of their average value, maximum value, and minimum value.

12. A stereoscopic computer graphics moving image generating apparatus according to claim 9, further comprising binocular parallax calculating means for calculating binocular parallax and binocular parallax judging means for judging the degree of change of binocular parallax based on said calculated binocular parallax, and wherein:

said object motion correcting means corrects said object sequence so that the change of said binocular parallax does not exceed a prescribed range.

13. A stereoscopic computer graphics moving image generating apparatus according to claim 12, wherein said object motion correcting means produces an output for display so that a portion of an object sequence where settings are improper for at least one of the change of the motion, motion parallax, and binocular parallax of the subject can be distinguished from other portions of the sequence.

14. A stereoscopic computer graphics moving image generating apparatus according to claim 12, wherein said object motion correcting means produces an output for display so that a portion corrected for improper settings of the change of at least one of the motion, motion parallax, and binocular parallax of the subject, can be distinguished from other portions of the sequence.

15. A stereoscopic computer graphics moving image generating apparatus according to claim 9, wherein the object motion correcting means corrects the object sequence automatically or manually.

16. A stereoscopic computer graphics moving image generating apparatus according to claim 9, wherein the object motion correcting means corrects the object sequence using at least one of the output of the motion calculating means, the size of a screen for image display, and a viewing distance of the viewer.

17. A stereoscopic computer graphics moving image generating apparatus comprising:

projection transformation means for generating a two-dimensional projection image as viewed from a camera using three-dimensional structural information of a subject;

rendering means for calculating a viewable image from the output of said projection transformation means;

camera sequence generating means for generating a camera parameter defining projection transformation in said projection transformation means and capable of generating a moving image by varying said projection transformation;

object sequence generating means for generating an object sequence defining said three-dimensional structural information and capable of generating a moving image by varying said three-dimensional structural information and thereby expressing the motion of the subject;

motion calculating means for calculating at least one of the motion and motion parallax of a displayed subject using at least one of said three-dimensional structural information, the output of said projection transformation means, the output of said rendering means, the output of said camera sequence generating means, and the output of said object sequence generating means;

camera parameter correcting means for correcting the camera parameters so that at least one of the motion and motion parallax of the displayed subject do not exceed a tolerance range of a viewer; and object motion correcting means for correcting the object sequence so that at least one of the motion and motion parallax of the displayed subject do not exceed the tolerance range of sense of the viewer, wherein said sense includes at least one of a sense of motion and a sense of depth, and said tolerance range of said sense of motion of a viewer corresponds to said motion, and said tolerance range of said sense of depth of a viewer corresponds to said motion parallax.

18. A stereoscopic computer graphics moving image generating apparatus according to claim 17, wherein there are a plurality of cameras and a plurality of projection transformation means, and said motion calculating means calculates at least one of the motion and motion parallax of the subject projection-transformed with a viewpoint at or near a central position among said plurality of cameras.

19. A stereoscopic computer graphics moving image generating apparatus according to claim 17, wherein there are plurality of cameras and a plurality of projection transformation means, and said motion calculating means calculates at least one of the motion and motion parallax of the subject projection-transformed with viewpoints at positions of at least one of said plurality of cameras, and outputs at least one of their average value, maximum value, and minimum value.

20. A stereoscopic computer graphics moving image generating apparatus according to claim 17, further comprising binocular parallax calculating means for calculating binocular parallax and binocular parallax judging means for judging the degree of change of binocular parallax using said calculated binocular parallax, and wherein:

said camera parameter correcting means corrects said camera parameter and the object motion correcting means corrects the object sequence so that the change of said binocular parallax does not exceed a prescribed range.

21. A stereoscopic computer graphics moving image generating apparatus according to claim 20, wherein said camera parameter correcting means and the object motion correcting means produce an output for display so that a portion of a camera sequence where settings are improper for at least one of the change of the motion, motion parallax, and binocular parallax of the subject and so that a portion of an object sequence where settings are improper for at least one of the change of the motion, motion parallax, and binocular parallax of the subject, can be distinguished from other portions of the sequence.

22. A stereoscopic computer graphics moving image generating apparatus according to claim 20, wherein said camera parameter correcting means and the object motion correcting means produce an output for display so that a portion corrected for improper settings of the change of at least one of the motion, motion parallax, and binocular parallax of the subject, can be distinguished from other portions of the sequence.

23. A stereoscopic computer graphics moving image generating apparatus according to claim 17, wherein the camera parameter correcting means corrects the camera parameter automatically or manually.

24. A stereoscopic computer graphics moving image generating apparatus according to claim 17, wherein the camera parameter correcting means corrects the camera parameter using at least one of the output of the motion calculating means, the size of a screen for image display, and a viewing distance of the viewer, and the object motion correcting means corrects the object sequence using at least one of the group consisting of the output of the motion calculating means, the size of a screen for image display, and a viewing distance of the viewer.

* * * * *

UNITED STATES PATENT AND TRADEMARK OFFICE
CERTIFICATE OF CORRECTION

PATENT NO.      : 6,204,876 B1
DATED           : March 20, 2001
INVENTOR(S)     : Uomori et al.

It is certified that error appears in the above-identified patent and that said Letters Patent is hereby corrected as shown below:

<u>Title page,</u>
Item [56], References Cited, OTHER PUBLICATIONS,
"European Search Report, Appn. No. 97114294-2201, dated April 4, 1999"
should read -- European Search Report, Appn. No. 971104294-2201, dated April 4, 1999 --.

Signed and Sealed this

Twenty-fourth Day of September, 2002

*Attest:*

JAMES E. ROGAN
*Attesting Officer*            *Director of the United States Patent and Trademark Office*